Patented July 28, 1936

2,048,790

UNITED STATES PATENT OFFICE 2,048,790

PROCESS OF PRODUCING ARYLAMINES OF THE BENZENE SERIES

William L. Foohey and Ferdinand W. Peck, Pennsgrove, N. J., assignors to E. I. du Pont de Nemours & Company, Wilmington, Del., a corporation of Delaware No Drawing. Application June 2, 1933, Serial No. 674,119

7 Claims. (Cl. 260—130.5)

This invention relates to arylamines, more particularly nitro-arylamines, and a process for the production thereof.

As is well known, the halogen atoms of certain aryl halides may be replaced with amino groups by an "amination" reaction, that is, a reaction with ammonia under suitable conditions. One of the more important manufacturing processes of this type is the production of nitro-arylamines by the reaction of ammonia with the halogen atom oriented ortho or para to a nitro group in a nitro-aryl halide. The usual operating procedure is similar to the following:

The halogenated aromatic compound containing a nitro group ortho or para to the halogen atom is suspended in a large excess of strong aqueous ammonia in a pressure vessel equipped for heating and agitation. The reaction is carried out by heating for the proper period of time at a suitable temperature, usually with vigorous agitation. The reaction mass is then cooled, the amino compound separating as an insoluble crystalline body. The mass is boiled to remove the excess ammonia and is also treated to remove any unchanged halogen compound. Since the latter substances are usually volatile with steam, the reaction mass, in such cases, is steam-distilled until removal of the unchanged starting material is complete. The mass is then cooled and the crystalline product is separated by filtration. Usually, it is purified by re-crystallization from a suitable solvent.

One of the principal uses for the nitro-arylamines is in the manufacture of azo dyes. In the manufacture of such products it is usually necessary to diazotize the nitro-arylamines, converting them to diazo salts which are subsequently coupled with other appropriate intermediates. As is well known to one skilled in the art of azo color manufacture, the diazotization of nitro-arylamines is a rather difficult process. On account of the low basicity of such amines and often because of their insolubility in the acid solutions used for diazotization, it is necessary that the arylamines be produced in a finely divided form in which they may be thoroughly dispersed in the acid medium prior to diazotization. Even in the instances where the amine dissolves in the acid, the rate of wetting-out and solution is extremely unsatisfactory unless the product is available in a finely divided form.

Nitro-arylamines produced according to the usual methods are not normally available directly in the desired form for use in color manufacture. Not only is their physical state ordinarily unsatisfactory but where the reaction is carried out in vessels which are subject to iron corrosion, the crude products contain appreciable amounts of iron compounds which cause discoloration and are removed only with difficulty. For this reason, it is usually necessary to purify the crude products obtained by the customary amination processes, dry the purified product and then grind it to the state of subdivision required for its use in diazotization.

It is an object of this invention to provide a new and improved process for the production of arylamines by the reaction of ammonia with the halogen of an aryl halide. A further object is the production of arylamines in a new and improved physical and chemical state in which they may be used directly for other manufacturing operations, such as, for example, azo color manufacture. Another object is the provision of a new and improved process for the production of mono- and poly-nitro-arylamines. A still further object is to produce nitro-arylamines by an improved process in which the products obtained are suitable for use in the manufacture of azo dyes without further purification or treatment to obtain satisfactory physical properties. Other objects will appear hereinafter.

These objects are accomplished according to this invention whereby in the production of primary arylamines by the reaction of ammonia with the halogen of an aryl halide to form an arylamine, the process is characterized by the improvement that the arylamine is recovered by forming it in liquid phase, then rapidly cooling the liquid mixture below the crystallization temperature of the arylamine, and separating the precipitate in the presence of ammonia. The product is obtained in a finely divided physical state and is substantially free from iron which may be produced by the corrosive action of the amination mass on the reaction vessel. This product is suitable without further purification or chemical treatment for diazotization in the production of azo dyes.

The invention will be further understood but is not limited by the following examples, in which the parts are by weight.

*Example I*

One hundred fifty-seven and five-tenths parts of para-nitro-chlorobenzene and approximately 950 parts of 28% aqueous ammonia were heated together with vigorous agitation for twenty hours at 165° C. to 170° C. in a suitable autoclave. At the end of this time, the amination was practically complete. The reaction mass was held at or near the above temperature while it was discharged (suitably under its own pressure) into a second autoclave, which was kept cool by passing water, brine or other suitable cooling agent or refrigerant through a surrounding jacket. The flow of the reaction mass was so regulated that the temperature in the receiving autoclave was allowed to rise but did not exceed 75° C. at any time. During this discharge of reaction mass to receiver, pressure due to water and ammonia vapors developed in the cooling vessel. This pressure was released slowly to a suitable system for recovery of the excess ammonia.

When all of the reaction mass had been discharged into the receiving autoclave, the mass was further cooled to a temperature of 25° C. to 30° C. and then filtered. The cake was washed with sufficient cold water to displace the mother liquor. The filtrate which still contained ammonia, was run to suitable equipment for further ammonia recovery.

The para-nitro-aniline so obtained was in the form of a yellow, finely crystalline paste, substantially free from para-nitro-chlorobenzene, iron oxide, and other impurities. It may be used directly for the preparation of dyes.

Example II

The process of Example I was repeated, except that the receiving autoclave was charged with a quantity (e. g., 200 to 1000 parts) of cold water before the reaction mass was added, in order to assist in the rapid cooling.

Example III

The process of Example I was repeated, except that the cooling of the charge was assisted and accelerated by the addition of ice to the receiver before and/or while the amination mass was discharged to this vessel.

Example IV

The process of Example I was repeated, except that the charge, after being blown to the receiver, was further cooled by the rapid addition thereto of water and/or ice, the quantity or quantities being regulated by the degree of cooling and amount of dilution desired.

Example V

A reaction mass was prepared by heating a mixture of 116 parts of 2:4-dinitro-chlorobenzene, 196 parts of 25% aqueous ammonia and 70 parts of water at 130° C. for ten hours. The mass was then heated to about 180° C. and blown into 360 parts of cold water in a cooled receiver. The temperature in the receiver was allowed to rise but was held below 60° C. during the discharging. The charge was then cooled to 20° C., and filtered. The product was 2:4-dinitro-aniline of good quality, suitable for immediate use in dye manufacture.

Example VI

A reaction mass was prepared by charging 192 parts of 2:5-dichloro-nitrobenzene and 486 parts of 28% aqueous ammonia into an autoclave and heating to 160° C. for twelve hours. The mass was blown into a cooled receiver at such a rate that the temperature in the receiver was allowed to rise but did not exceed 75° C. The mass was subsequently cooled to 20° C., and filtered. The product was 4-chloro-2-nitro-aniline of good quality, suitable for use in color manufacture without intermediate purification.

Example VII

The process of Example I was repeated, except that 157.5 parts of ortho-nitrochlorobenzene were substituted for the 157.5 parts of para-nitrochlorobenzene, and that the maximum temperature in the receiving vessel during the discharging was 60° C. The product was ortho-nitro-aniline of quality suitable for use in dye manufacture.

It will be understood that this invention does not involve the general details of the amination reaction such as temperature, pressure, concentrations and quantities of reactants which are known to those skilled in the art. It is desirable, however, for the purposes of the invention that the amination be conducted in such a way that it is substantially complete. The aryl halide subjected to amination in accordance with the invention should be such that the arylamine is formed in liquid phase in the reaction mixture under the conditions of amination; that is to say, the arylamine produced may be present in the reaction mass either as a liquid immiscible or only partly miscible in the aqueous ammonia solution, or as a solution in the aqueous ammonia. It will be readily understood, however, that the amination process may be carried out at temperatures at which the product is obtained as a crystalline material, provided that prior to isolation of the amino body, the temperature be raised sufficiently to cause the reaction product to revert to the liquid phase.

As will be understood, the aryl halides in which a nitro group is oriented ortho or para to the halogen atom to be replaced by amination are particularly suitable for this type of amination, since the presence of nitro groups in such positions with relation to the halogen atoms increases the activity and ease of replacement of the latter substituents. Halogen atoms which are readily removable by amination are fluorine, chlorine, bromine and iodine.

In addition to the compounds described in the examples, the application of the invention to the production of the following specific products may be mentioned:

| Nitro compound aminated | Nitro-arylamine obtained |
| --- | --- |
| 4-Nitro-1-chloronaphthalene | 4-Nitro-1-naphthylamine |
| 3-Methoxy-4-nitro-chlorobenzene | 3-Methoxy-4-nitraniline |
| 4-Chloro-3-nitro-diphenyl | 4-Amino-3-nitro-diphenyl |
| 4-Bromo-2-nitro-1-chlorobenzene | 4-Bromo-2-nitraniline |
| 4-Chloro-3-nitro-toluene | 3-Nitro-4-amino-toluene |
| 4-Nitro-5-chloro-2-methoxy-toluene | 4-Nitro-5-amino-2-methoxy-toluene |

As indicated by the examples, the method employed in cooling the liquid reaction mixture is subject to variation. One method consists in blowing the hot reaction mass into a second autoclave or pressure vessel under its own pressure. Another method consists in introducing the liquid reaction mixture into a large volume of cold water. Heat may be withdrawn in any suitable manner, for example, by means of a refrigerant circulated through coils in heat exchange relationship with the mixture to be cooled, or by direct introduction of ice into the cooling zone. The cooling may be carried out in open vessels with proper precautions, for instance, against the escape of large quantities of ammonia gas.

The pressure in the cooling zone may be atmospheric, sub-atmospheric or super-atmospheric, depending largely upon the results desired.

The maximum allowable temperature in the cooling zone during the addition of the reaction mixture may be varied. Ordinarily, the reaction mixture is charged into a closed receiver equipped with cooling means. The cooling may be effected wholly or in part by direct contact with water contained in the receiver. The temperature in the receiver is allowed to rise above room temperature, due to the heat in the reaction mixture, to temperatures of, say, about 60° C. or about 75° C., as indicated by the examples, but not higher than the temperature at which the aqueous phase will lose all of its dissolved ammonia, namely, 95° to 100° C. at atmospheric pressures. The final cooling temperature after the ammonia has been released should be such that substantially the only substance crystallized is the nitro-arylamine, as, for instance, a temperature of 20° to 30° C.

As previously indicated, the filtration of the precipitated arylamine is effected in the presence of ammonia. It has been observed that the nitro-arylamines produced according to the methods of the prior art are usually dark in color and contain appreciable quantities of iron in the form of an oxide or complex salt. This iron is produced by corrosive action of the amination mass on the reaction vessel and is present in the finished amination mass as a soluble complex salt or in the form of a colloid. When the reaction mass is steam-distilled to remove ammonia prior to the separation of the nitro-arylamine, the procedure commonly followed in past processes, this "soluble iron" is converted to the insoluble oxide or salt. This material then appears as an impurity in the nitro-arylamine, results in a darkening of the color of the product, and makes it unsuitable for use in diazo salt preparation without intermediate purification. By separating the nitro-arylamine from the mother liquor according to the present invention prior to complete ammonia removal, the soluble iron is removed in the filtration process and results in the production of a material of much improved quality.

The use of this process results in the production of arylamines of very good quality without purification. The products are substantially pure except for water, are free from discoloration and are in a desirable physical form for use in color manufacture. Para-nitraniline made by this process, for example, can be diazotized without preliminary solution in acid, it is only necessary to stir the para-nitraniline with acid at ordinary temperatures until a smooth suspension is obtained, cool to the temperature of diazotization, and continue the operation in the usual manner.

The products of the ordinary processes for the manufacture of arylamines such as para-nitraniline, on the other hand, are dark in color, due in part to the presence of iron, and are of large particle size. They are, therefore, unsuitable for use in the manufacture of dyes unless first subjected to some purification and grinding process with a consequent increase in cost.

In referring to the reaction between ammonia and nitro-aryl-halides, by "an excess of ammonia" we mean an excess over that theoretically required to convert the nitro-aryl-halide to the corresponding nitro-arylamine.

As many apparently widely different embodiments of this invention may be made without departing from the spirit and scope thereof, it is to be understood that we do not limit ourselves to the specific embodiments thereof except as defined in the following claims.

We claim:

1. The batch-type process of producing para-nitraniline which comprises heating together excess ammonia, water and para-nitro-chlorobenzene under amination conditions in a vessel of the type normally used in batch operations until amination is practically complete, cooling the liquid reaction mixture rapidly to about 60° C. to about 75° C., removing the vaporized ammonia, and filtering the precipitate at a temperature of about 25° C. to about 30° C. in the presence of the remaining ammonia.

2. The batch-type process of preparing para-nitraniline in finely divided form suitable for use in dye manufacture, which comprises heating together para-nitro-chlorobenzene, excess ammonia and water in a closed vessel of the type normally used in batch operations under amination conditions until the amination is practically complete, discharging the liquid reaction mixture under its own pressure into a second closed vessel maintained at an intermediate temperature from about 60° C. to about 75° C., releasing the pressure in the second vessel to an ammonia recovery system, cooling to a temperature of about 25° C. to about 30° C., and filtering the precipitated product in the presence of the remaining ammonia.

3. The batch-type process of preparing para-nitraniline in finely divided form suitable for direct use in dye manufacture which comprises heating together 157.5 parts of para-nitro-chlorobenzene and 950 parts of approximately 28% ammonia in a closed vessel of the type normally used in batch operations at a temperature of about 165° C. to about 170° C. until the amination is practically complete, discharging the liquid reaction mixture under its own pressure into a second closed vessel maintained at an intermediate temperature from about 60° C. to about 75° C., releasing the pressure in the second vessel to an ammonia recovery system, cooling to a temperature of about 25° C. to about 30° C., and filtering the product in the presence of the remaining ammonia.

4. In a batch-type process of producing a primary nitro-arylamine of the benzene series by the reaction of excess aqueous ammonia with the halogen of a nitro-aryl halide of the benzene series in which a nitro group is oriented ortho- or para- to the halogen atom to be replaced by amination, the improvement which comprises forming it in liquid phase in the reaction mixture, rapidly cooling the liquid reaction mixture to a temperature within the range of about 60° C. to about 95° C. in a closed vessel of the type normally used in batch operations, releasing the pressure of ammonia, further cooling to about 20° C. to about 30° C., and separating the crystallized nitro-arylamine in the presence of the residual ammonia.

5. In a batch type process of producing a primary nitro-arylamine of the benzene series by the reaction of excess aqueous ammonia with the chlorine of a nitro-aryl-chloride of the benzene series in which a nitro group is oriented ortho- or para- to the chlorine atom to be replaced by amination, the improvement which comprises forming said primary nitro-arylamine in liquid phase in the reaction mixture, adding said reaction mixture to an amount of water such as to bring the temperature to about 60° C. to about 75° C. in a closed vessel, releasing the pressure of ammonia, further cooling to about 20° C. to about 30° C., and recovering the nitro-arylamine in the presence of the residual ammonia whereby said nitro-arylamine is obtained in a form directly suitable for the production of azo dyes.

6. The process of claim 5 in which the nitro-arylamine is para-nitraniline.

7. In a process of producing a primary nitro-arylamine of the benzene series by the reaction of excess aqueous ammonia with the halogen of a nitro-aryl halide of the benzene series in which a nitro group is oriented ortho or para to the halogen atom to be replaced by amination, the improvement which comprises forming the primary nitro-arylamine in liquid phase in the reaction mixture, rapidly cooling the said reaction mixture to a temperature range above about 60° C. but below the temperature at which the aqueous phase loses its dissolved ammonia, whereby a substantial amount but not all of the excess ammonia is vaporized, removing said vaporized ammonia, further cooling to a temperature such that essentially the only substance formed in solid phase is the nitro-arylamine, and recovering the nitro-arylamine in the presence of the remaining ammonia whereby said nitro-arylamine is obtained in a form directly suitable for the production of azo dyes.

WILLIAM L. FOOHEY.
FERDINAND W. PECK.